US012793991B2

(12) United States Patent
Jeong

(10) Patent No.: US 12,793,991 B2
(45) Date of Patent: Nov. 10, 2026

(54) APPARATUS AND METHOD FOR MANUFACTURING SEPARATOR FOR FUEL CELL

(71) Applicant: SOLUM ADVANCED MATERIALS CO., LTD., Gangneung-si (KR)

(72) Inventor: Hyo Tae Jeong, Gangneung-si (KR)

(73) Assignee: SOLUM ADVANCED MATERIALS CO., LTD., Gangneung-si (KR)

( * ) Notice: Subject to any disclaimer, the term of this patent is extended or adjusted under 35 U.S.C. 154(b) by 100 days.

(21) Appl. No.: 18/725,645

(22) PCT Filed: Dec. 29, 2022

(86) PCT No.: PCT/KR2022/021596
§ 371 (c)(1),
(2) Date: Jun. 28, 2024

(87) PCT Pub. No.: WO2023/128653
PCT Pub. Date: Jul. 6, 2023

(65) Prior Publication Data

US 2025/0174678 A1 May 29, 2025

(30) Foreign Application Priority Data

Dec. 30, 2021 (KR) ........................ 10-2021-0192660

(51) Int. Cl.
*H01M 8/026* (2016.01)

(52) U.S. Cl.
CPC .................................. *H01M 8/026* (2013.01)

(58) Field of Classification Search
CPC ... H01M 8/026; H01M 8/0221; H01M 8/0241
See application file for complete search history.

(56) References Cited

U.S. PATENT DOCUMENTS

| | | | | |
|---|---|---|---|---|
| 8,790,846 | B2 | 7/2014 | Yamauchi et al. | |
| 2002/0127464 | A1 * | 9/2002 | Terazawa | B29C 48/05 429/535 |
| 2017/0194655 | A1 | 7/2017 | Yoshida | |
| 2022/0161483 | A1 * | 5/2022 | Imaizumi | B29C 33/58 |

FOREIGN PATENT DOCUMENTS

| | | | |
|---|---|---|---|
| JP | 4818486 | B2 | 11/2011 |
| KR | 10-2010-0078723 | A | 7/2010 |
| KR | 10-1321125 | B1 | 10/2013 |
| KR | 10-2017-0003668 | A | 1/2017 |
| KR | 10-1705190 | B1 | 2/2017 |

* cited by examiner

*Primary Examiner* — Alison L Hindenlang
*Assistant Examiner* — Shibin Liang
(74) *Attorney, Agent, or Firm* — Bridgeway IP Law Group, PLLC; Sang Ho Lee; Hyun Woo Shin

(57) ABSTRACT

The present disclosure relates to a manufacturing apparatus for a separator for a fuel cell and may include a primary mold including an upper mold in which an upper molding part is formed and a lower mold in which a lower molding part is formed to form a flow path on a material; a secondary mold including a pressing roll rotating with a predetermined pressing force and a roll die in which a lower aligning part is formed, and re-pressing a molded product formed by pressing the material in the primary mold to planarize a top surface of a side wall of the flow path formed in the molded product.

5 Claims, 19 Drawing Sheets

APPARATUS AND METHOD FOR MANUFACTURING SEPARATOR FOR FUEL CELL

STATEMENT REGARDING SPONSORED RESEARCH OR DEVELOPMENT

The research and development of the present invention was conducted with the support of the Korea Planning & Evaluation Institute of Industrial Technology (KEIT), with financial resources provided by the Ministry of Trade, Industry and Energy (MOTIE), under the project titled "Design and Manufacturing Technology for 400 $cm^2$-Class Thick Plate-Type SOFC Separator Based on High-Temperature Plastic Working" (Project Unique Number: 1415173874 Project Number: 20015767).

TECHNICAL FIELD

The present disclosure relates to an apparatus and method for manufacturing a separator coupled to a fuel cell, and more specifically to a manufacturing apparatus for a separator for a fuel cell having a flat contact surface and a method thereof.

BACKGROUND ART

In general, a fuel cell is an energy conversion device that produces direct current electricity by electrochemically reacting an oxidizer and a vaporous fuel through an oxide electrolyte, by using a technology that converts chemical energy from a chemical reaction of hydrogen and oxygen directly into electric energy. The fuel cell is a cell that is configured to generate electricity continuously by supplying fuel and an oxidizer from the outside. Here, the fuel can be hydrocarbons, alcohols, etc., and the oxidizer can be air, chlorine, chlorine dioxide, etc.

A fuel cell includes a Molten Carbonate Fuel Cell (MCFC), a Polymer Electrolyte Membrane Fuel Cell (PEMFC), a Solid Oxide Fuel Cell (SOFC), a Direct Methanol Fuel Cell (DMFC), a Direct Ethanol Fuel Cell (DEFC), a Phosphoric Acid Fuel Cell (PAFC), a Direct Carbon Fuel Cells (DCFC), etc., and is formed by combining a fuel electrode and an air electrode around an electrolyte membrane on both sides to form a membrane electrode assembly, and a separator is formed on the outer side to form a unit cell. These unit cells are laminated to form a stack, wherein the stack is formed with a coolant inlet and outlet, a fuel and air inlet and outlet, and may be assembled with end plates and enclosures.

Here, the separator is formed on the outside of the membrane electrode assembly to form a flow path so that fuel and air can flow, and when connecting each unit cell, mixing of gases can be prevented by electrically connecting the air electrode and the fuel electrode.

Multiple separators are coupled to a highly laminated fuel cell stack with a large area, and fluidity of fuel and air flowing through each separator and flow rate of electrons moving to the contact surface with the membrane electrode assembly greatly affect a current collection rate of the entire stack. Therefore, the design of the shape and contact area of the flow path is important.

Further, the separator accounts for 40% to 60% of the cost of the entire stack, which is the largest portion of manufacturing cost of a fuel cell. Accordingly, it is necessary to reduce the manufacturing cost of the separator in order to reduce the manufacturing cost of the fuel cell.

DISCLOSURE

Technical Problem

The present invention is devised to solve the problems described above, and aims to provide a manufacturing apparatus for a separator for a fuel cell and a manufacturing method thereof configured to manufacture the separator for a fuel cell through a forging process, configured to further planarize a contact surface of the separator through a secondary pressing, and configured to expand the contact surface. However, these problems are exemplary and do not limit the scope of the present invention.

Technical Solution

A manufacturing apparatus for a separator for a fuel cell according to the ideas of the present disclosure to solve the above problems may include a primary mold including an upper mold in which an upper molding part is formed, and a lower mold in which a lower molding part is formed, to form a flow path on a material; a secondary mold including a pressing roll rotating with a predetermined pressing force and a roll die in which a lower aligning part is formed, and re-pressing a molded product formed by pressing the material in the primary mold to planarize a top surface of a side wall of the flow path formed in the molded product.

Further, according to the present disclosure, the primary mold may include a flow path molding part which forms a flow path on at least one of an upper surface and a lower surface of the material; an edge molding part which molds an edge of the flow path; and a rib molding part which forms the side wall; wherein the flow path molding part may be formed to be higher than the edge molding part so that the flow path formed on the molded product is molded to be deeper than the edge, and the rib molding part may be formed to be deeper than the edge molding part so that the side wall formed on the molded product is formed to be higher than the edge.

Further, according to the present disclosure, the pressing roll of the secondary mold may be pressed to a position of the edge of the molded product or rotated while pressing to a position below a height of the edge to increase an area of the top surface of the side wall.

Further, according to the present disclosure, the secondary mold may be formed with the roll die of the secondary mold fixed and the pressing roll configured to move in a rotating and pressed state so that the pressing roll moves to an upper surface of the molded product aligned on the roll die and presses the upper surface of the molded product.

Further, according to the present disclosure, the secondary mold may be formed with the pressing roll of the secondary mold fixed and the roll die configured to move so that the molded product aligned on the roll die may move with the roll die and press an upper surface of the molded product.

Further, according to the present disclosure, a tertiary mold including a tertiary pressing roll rotating with the predetermined pressing force and a roll die in which a tertiary aligning part is formed, and pressing a secondary molded product formed by pressing the molded product in the secondary mold to planarize a top surface of a side wall of a flow path formed on other surface of the molded product, may be included.

A manufacturing method of a separator for a fuel cell according to the ideas of the present disclosure to solve the above problems may include a preparation step of transporting a material to a primary mold including an upper mold in which an upper molding part is formed and a lower mold in which a lower molding part is formed, and aligning; a primary pressing step of pressing the material with the primary mold to form a flow path; and a secondary pressing step of re-pressing with a secondary mold including a pressing roll rotating with a predetermined pressing force and a roll die in which a lower aligning part is formed to planarize a top surface of a side wall of the flow path formed by primary pressing the material.

Further, according to the present disclosure, the primary pressing step may press so that the flow path formed on the material is molded to be deeper than an edge, and press so that the side wall is formed to be higher than the edge.

Further, according to the present disclosure, the secondary pressing step may press to a position of a height of the edge of the molded product, or press to a position below the height of the edge to increase an area of the top surface of the side wall formed by primary pressing the material.

Further, according to the present disclosure, a transport step of transporting the molded product molded in the primary mold to the secondary mold may be included after the primary pressing step.

Further, according to the present disclosure, the transport step may include an alignment step of combining and aligning the flow path and the side wall formed on the lower surface of the molded product to the lower aligning part.

Further, according to the present disclosure, a mold replacing step of moving the lower mold to the lower part of the pressing roll so that the lower molding part formed on the lower mold becomes the lower aligning part formed on the roll die, and the lower mold of the primary mold becomes the roll die of the secondary mold to secondary press the molded product with the pressing roll may be further included after the primary pressing step.

Further, according to the present disclosure, the secondary pressing step may include a pressing roll movement step in which the roll die of the secondary mold is fixed, and the pressing roll is formed to be able to move while pressing in a rotated state, and the pressing roll presses the upper surface while moving toward the upper surface of the molded product aligned on the roll die.

Further, according to the present disclosure, the secondary pressing step may include a roll die movement step in which the pressing roll of the secondary mold is fixed, the roll die is formed to be able to move, and the molded product aligned on the roll die moves with the roll die to press the upper surface of the molded product.

Further, according to the present disclosure, a tertiary pressing step of pressing a secondary molded product formed by pressing the molded product in the secondary mold, with a tertiary mold including a tertiary pressing roll rotating with a predetermined pressing force and a roll die in which a tertiary aligning part is formed to planarize a top surface of a side wall of a flow path formed on other side of the secondary molded product after the secondary pressing step.

Effect of the Invention

According to some embodiment of the present disclosure as described above, by manufacturing a separator for a fuel cell can be manufactured through a forging process, production rate can be increased in a process of bending and joining a plate material. Further, it allows for a uniform production of a product which improves quality of the product, and it is advantageous for stiffness and strain of the product.

Further, through a secondary pressing, a contact surface of the separator that a membrane electrode assembly is joined to can be planarized, and flow of electrons can be increased by expanding a contact area. Further, an area of a flow path for fuel and air flow can be ensured, while a contact area with the membrane electrode assembly can be increased and contact resistance can reduced, thereby increasing a current collection rate of a stack to improve its quality. However, the scope of the present disclosure is not limited by these effects.

MODE FOR INVENTION

Figure 1:
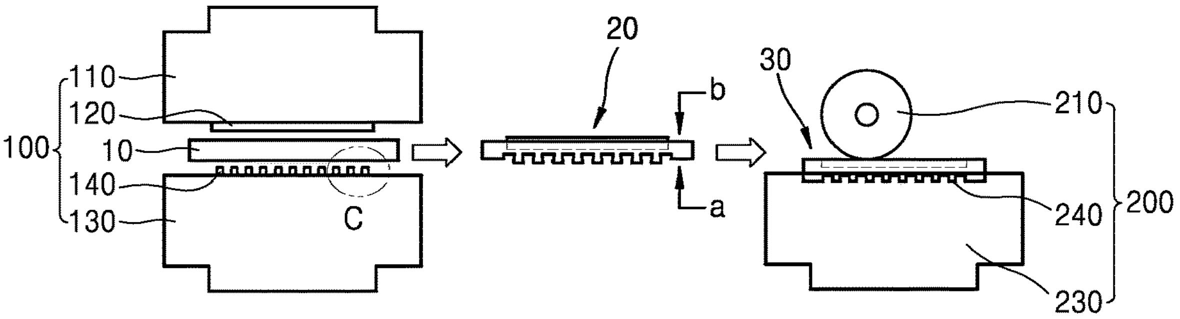
FIG. 1 is a diagram showing a manufacturing apparatus for a separator for a fuel cell according to an embodiment of the present disclosure.

Hereinafter, the present disclosure will be described in detail by explaining embodiments of the present disclosure with reference to the attached drawings.

Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art. In the drawings, the thicknesses or sizes of layers are exaggerated for clarity.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises" and/or "comprising" used herein specify the presence of stated shapes, numbers, steps, operations, members, elements, and/or groups thereof, but do not preclude the presence or addition of one or more other shapes, numbers, steps, operations, members, elements, and/or groups thereof.

Embodiments of the disclosure are described herein with reference to schematic illustrations of idealized embodiments (and intermediate structures) of the disclosure. In the drawings, for example, according to the manufacturing technology and/or tolerance, variations from the illustrated shape may be expected. Thus, the embodiments of the disclosure should not be construed as limited to the particular shapes of regions illustrated herein, but are to include deviations in shapes that result, for example, from manufacturing.

Hereinafter, a material processing method according to various embodiments of the present disclosure will be described in detail with reference to the drawings.

Figure 2:
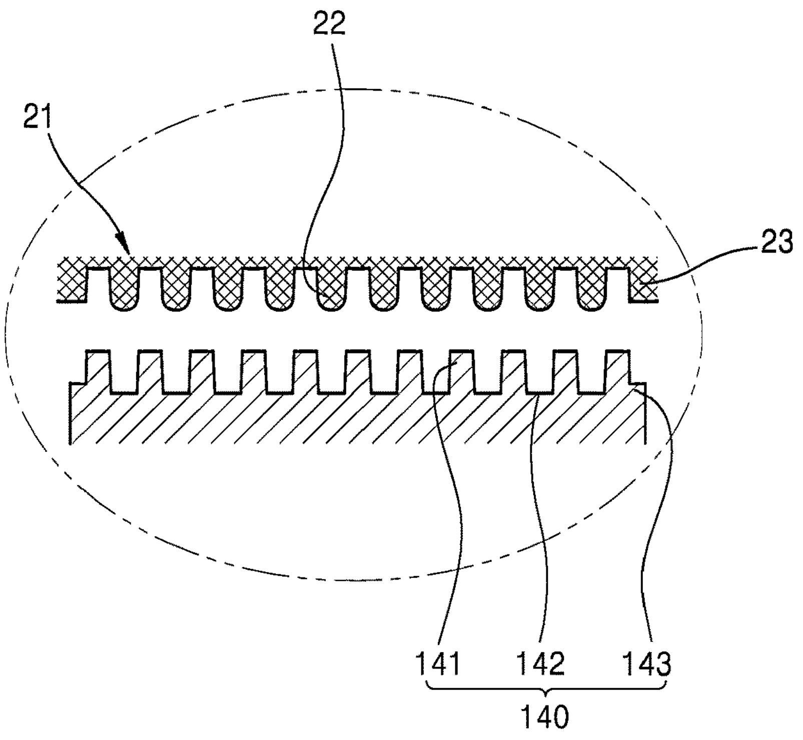
FIG. 2 is a diagram showing a lower molding part and a molded product of a primary mold of 'C' area of FIG. 1.

FIG. 1 is a diagram showing a manufacturing apparatus for a separator for a fuel cell according to an embodiment of the present disclosure, and FIG. 2 is a diagram showing a lower molding part 140 and a molded product 20 of a primary mold 100 of 'C' area of FIG. 1.

First, as shown in FIG. 1, the manufacturing apparatus for a separator for a fuel cell according to the embodiments of the present disclosure may include a primary mold 100 and a secondary mold 200.

The primary mold 100 may include an upper mold 110 in which an upper molding part 120 is formed and a lower mold 130 in which a lower molding part 140 is formed to form a flow path on a material 10.

As shown in FIG. 1, the upper mold 110 is an upper mold formed on an upper part of a forging mold, in which the upper molding part 120 is formed, and the material 10 can be pressed using a high-capacity press. The material 10 contacting the upper mold 110 can be plastically deformed into a shape corresponding to the upper molding part 120.

The lower mold 130 is a lower mold formed on a lower part of the forging mold, the lower molding part 140 is formed inside, and is formed to be corresponding to the upper mold 110 so that it can be joined with the upper mold 110.

Here, a flow path molding part may be formed in the upper molding part 120 and the lower molding part 140 to form the flow path in the material 10. The flow path molding part may be formed as a protruding and recessed portion of a complex shape to form the flow path of the separator for a fuel cell.

Specifically, as shown in FIG. 2, the lower molding part 140 may include a flow path molding part 141, a rib molding part 142, and an edge molding part 143.

The flow path molding part 141 forms a flow path 21 on at least one side of an upper surface (b) and a lower surface (a) of the material 10, the edge molding part 143 molds an edge 23 of the flow path 21, and the rib molding part 142 forms a side wall 22 of the flow path 21.

For example, the material 10 is processed into a molded product 20 through the flow path molding part 141, the rib molding part 142, and the edge molding part 143 formed in the lower molding part 140, and the flow path 21, the side wall 22, and the edge 23 may be formed on the lower surface (b) of the molded product 20.

The flow path 21 may be a flow space formed in the separator for a fuel cell to supply hydrogen, oxygen, or air and immediately discharge water generated by reaction to outside.

As shown in FIG. 2, the flow path molding part 141 formed in a protruding shape of the lower molding part 140 can be formed to be higher than the edge molding part 143, so that the flow path 21 formed in a groove shape of the molded product 20 can be formed to be deeper than the edge 23.

Further, the rib molding part 142 formed in a groove shape of the lower molding part 140 can be formed to be deeper than the edge molding part 143 so that the side wall 22 formed in the protruding shape of the molded product 20 can be formed to be higher than the edge 23.

That is, the flow path 21 formed on the separator is formed to be deeper than the edge 23 which is a reference surface, and the side wall 22 which is a rib, is formed to protrude beyond the edge 23 so that a volume planarized in a secondary mold 300 described later can be changed.

The flow path molding part, which is formed respectively in the upper molding part 120 and the lower molding part 140, may be formed in different directions. For example, the flow path molding part formed in the upper molding part 120 may be formed in left and right directions as shown in FIG. 1, and the flow path molding part formed in the lower molding area 140 may be formed in front and rear directions.

Here, the material 10 being pressed may include a flat plate-like shaped separator coupled to a fuel cell. For example, the upper molding part 120 and the lower molding part 140 are molding parts for forming a fuel flow path and an air flow path formed on both sides of the separator.

The upper molding part 120 and the lower molding part 140 may be formed into a complex flow path shape, and the direction connecting a start point and an end point of each flow path molding part in the upper molding part 120 and lower molding part 140 may be in a direction of the flow paths of the upper molding part 120 and lower molding part 140.

By processing material 10 through a forging process of the primary mold 100, a uniform separator flow path can be manufactured on which reaction gas can be distributed evenly, and multiple flow paths can be manufactured with uniform and identical quality.

The secondary mold 200 may include a pressing roll 210 rotating with a predetermined pressing force and a roll die 230 on which a lower aligning part 240 is formed.

The pressing roll 210 can press the molded product 20 which is aligned on the lower aligning part 240 formed on the roll die 230 from the upper part. Here, the pressing roll 210 may include a rotatable roll press device in a shape of a cylinder.

The pressing roll 210 can be pressed up to a height of the edge 23 of the molded product 20. Thus, as the side wall 22 formed on the molded product 20 is planarized, the height of the side wall 22 can be formed to be identical to a height of the edge 23.

That is, the pressing roll 210 can planarize a top surface of the side wall 22 of the flow path 21 formed on the molded product 20 by re-pressing the molded product 20 formed by pressing the material 10 in the primary mold 100.

The roll die 230 is a lower mold formed at a lower part of the secondary mold, in which a lower aligning part 240 is formed, and the molded product 20 seated on the lower aligning part 240 may be formed to support the pressing of the pressing roll 210.

The lower aligning part 240 is formed in the same shape as the lower molding part 140, so the lower surface (a) of the molded product 20 can be coupled to the lower aligning part 240.

Specifically, when the pressing roll 210 presses the upper surface (b) of the molded product 20, the lower aligning part 240 may be formed in a shape corresponding to the flow path 21, the side wall 22, and the edge 23 of the molded product 20 to support the molded product 20 from the lower part.

Alternatively, when the pressing roll 210 presses the upper surface (b) of the molded product 20, the lower aligning part 240 may be formed in a shape corresponding to the flow path 21 to support the flow path 21 of the molded product 20 from the lower part, and the side wall 22 can be formed in a height lower than the height of the side wall 22 to be pressed by the roll die 230.

Further, in order to increase an area of the top surface of the side wall 22, the pressing roll 210 can be pressed to a position of the edge 23 of the molded product 20, or can be rotated while pressing to a position lower than the height of the edge 23.

Specifically, the pressing roll 210 not only planarizes the top surface of the side wall 22, but also further presses so that the side wall 22 is deformed by pressing the pressing roll 210, and a distance between the side wall 22 and another side wall formed right next to the side wall 22 can become closer. That is, the width of the flow path 21 does not change, and the top surface of the side wall 22 is deformed so that upper area or lower area of the molded product 20 used as the separator can be expanded.

Thus, through the secondary mold 200, the surface where the flow path of the separator for a fuel cell is formed can be planarized, or the area where the flow path is formed on which a membrane electrode assembly and the separator come in contact can be expanded.

The secondary mold 200 can be formed with the roll die 230 of the secondary mold 200 fixed and the pressing roll 210 configured to move in a rotating and pressed state so that the pressing roll 210 moves to the upper surface (b) of the molded product 20 aligned on the roll die 230 and presses the upper surface (b) of the molded product 20.

The secondary mold 200 can be formed with the pressing roll 210 of the secondary mold 200 fixed and the roll die 230 configured to move so that the molded product 20 aligned on the roll die 230 moves with the roll die 230 and presses the upper surface (b) of the molded product 20.

Figure 3:
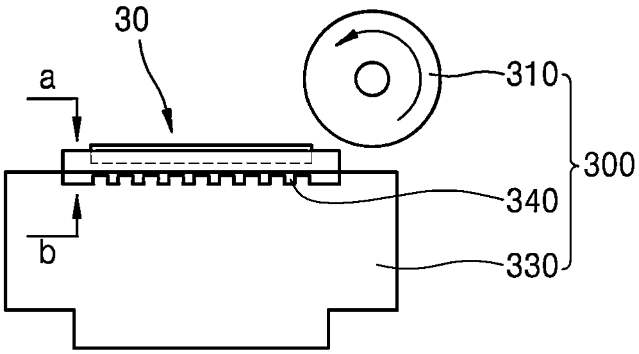
FIG. 3 is a diagram showing a tertiary mold according to another embodiment of the present disclosure.

FIG. 3 is a diagram showing a tertiary mold 300 according to another embodiment of the present disclosure.

As shown in FIG. 3, the tertiary mold 300 may include a tertiary pressing roll 310 rotating with a predetermined pressing force and a roll die 330 in which a tertiary aligning part 340 is formed to press a secondary molded product 30 formed by pressing the molded product 20 in the secondary mold 200 to planarize the top surface of the side wall of the flow path formed on other side (a) of the molded product 20.

The tertiary mold 300 can press a lower surface (a) of the secondary molded product 30 as the tertiary pressing roll 310 moves, or the secondary molded product 30 aligned on the roll die 330 can press the lower surface (a) of the secondary molded product 30 while moving with the roll die 230.

Thus, the tertiary mold 300 can be used to planarize both sides of the separator for fuel cells or to expand the contact area.

FIGS. 4 to 9 are flowcharts showing a manufacturing method of a separator for a fuel cell according to various embodiments of the present disclosure.

Figure 4:
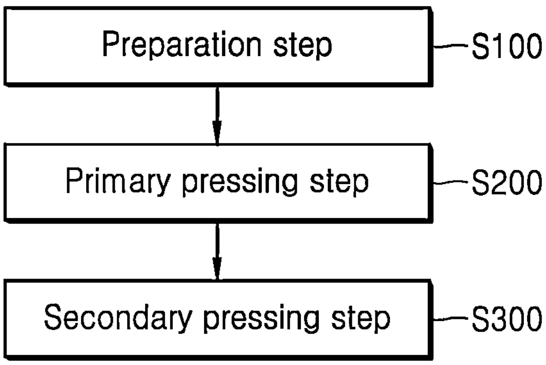
FIG. 4 is a flowchart showing a manufacturing method of a separator for a fuel cell according to an embodiment of the present disclosure.

The manufacturing method of a separator for a fuel cell according to an embodiment of the present disclosure may include a preparation step S100, a primary pressing step S200, and a secondary pressing step S300 as shown in FIG. 4.

Figure 10:
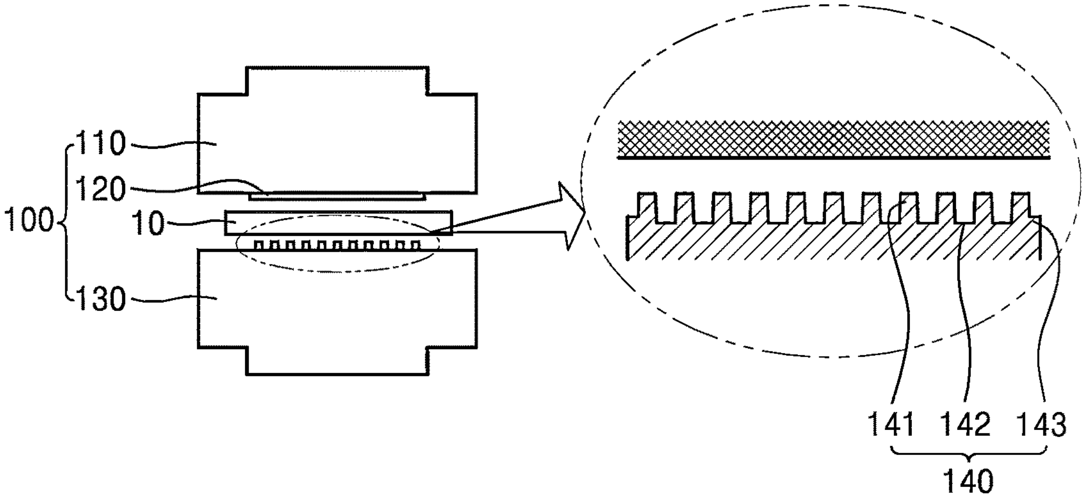
FIG. 10 is a diagram showing a preparation step according to an embodiment of the present disclosure.

FIG. 10 is a diagram showing a preparation step according to an embodiment of the present disclosure.

The preparation step S100 is the step of aligning the material 10 by transporting it to the primary mold 100 including the upper mold 110 in which the upper molding part 120 is formed, and the lower mold 130 in which the lower molding part 140 is formed.

As shown in FIG. 10, the preparation step S100 is a step of preparing for transporting and pressing the material 10 between the upper mold 110 and the lower mold 130 to press the material 10 using a high-capacity press including the upper mold 110 and the lower mold 130.

Here, the flow path molding part for forming the flow path may be formed on the upper molding part 120 formed in the upper mold 110 and the lower molding part 140 formed in the lower mold 130. The flow path molding part may be formed as a protruding and recessed portion of a complex shape to form the flow path of a separator for fuel cells.

For example, as shown in FIG. 10, the lower molding part 140 formed in the primary mold 100 of the preparation step S100 may include the flow path molding part 141 formed as a protruding part, the rib molding part 142 formed as a groove, and the edge molding part 143 formed at the edge of the lower molding part 140.

The preparation step S100 may include a material heating step of heating the material 10 before or after transporting the material 10 to a mold.

The preparation step S100 may include a mold heating step of heating the mold.

Figure 11:
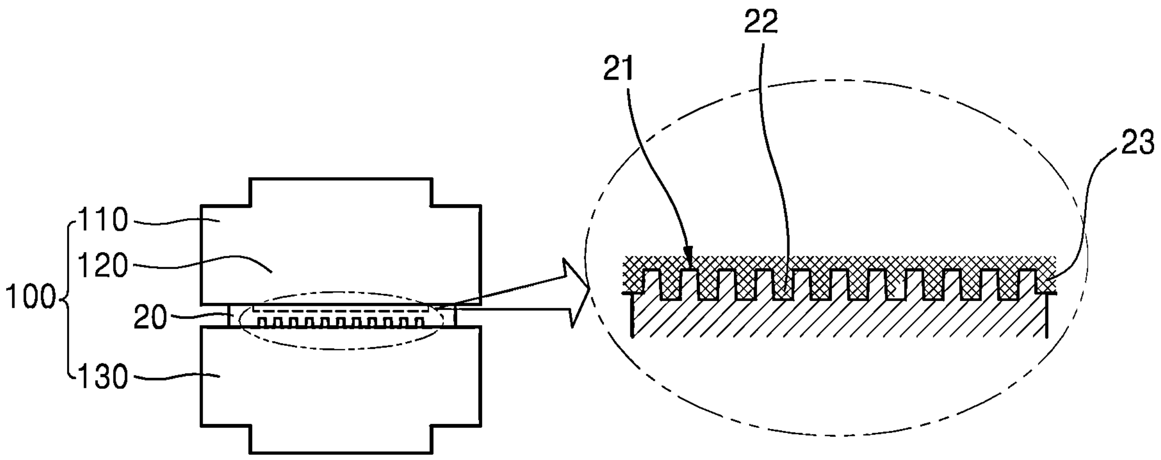
FIG. 11 is a diagram showing a primary pressing step according to an embodiment of the present disclosure.
Figure 12:
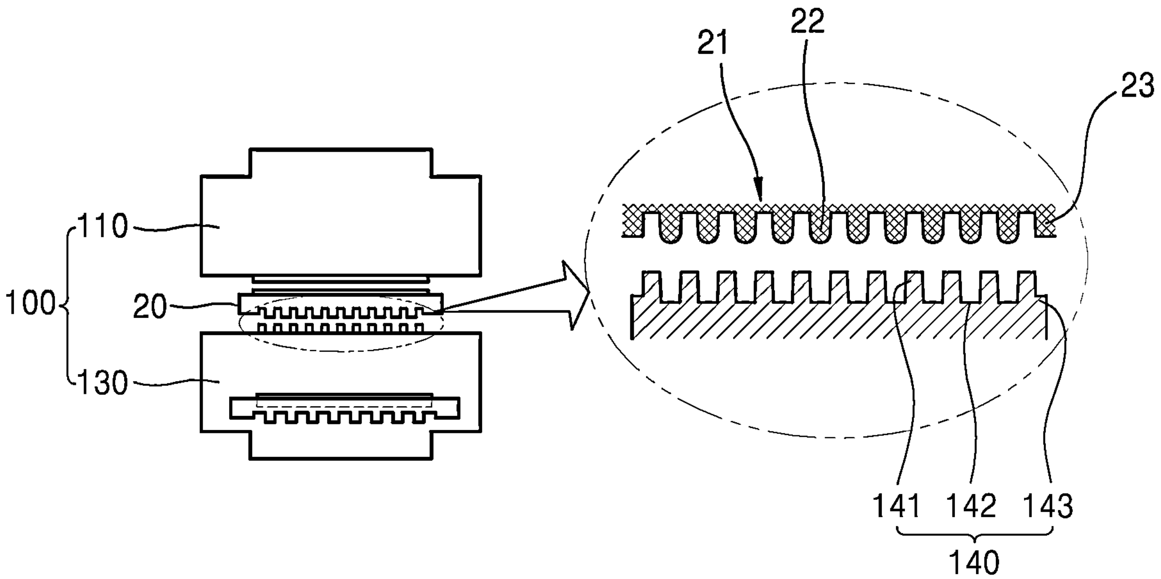
FIG. 12 is a diagram showing a state in which the primary mold is released after the primary pressing step of the present disclosure.

FIG. 11 is a diagram showing the primary pressing step S200 according to an embodiment of the present disclosure, and FIG. 12 is a diagram showing a state in which the primary mold 100 is released after the primary pressing step S200 of the present disclosure.

The primary pressing step S200 is a step of pressing the material 10 with the primary mold 100 to form the flow path 21, wherein the material 10 which is disposed between the upper mold 110 and the lower mold 130 is pressed by the upper mold 110 to be joined with the lower mold 130 to press the material 10.

In the primary pressing step S200, the material 10 may be plastically deformed into a shape corresponding to the upper molding part 120 or the lower molding part 140.

For example, in the primary pressing step, the material 10 can be processed into the molded product 20 through the flow path molding part 141, the rib molding part 142, and the edge molding part 143 formed in the lower molding part 140, and the flow path 21, the side wall 22, and the edge 23 may be formed on the lower surface (b) of the molded product 20 as shown in FIG. 11.

The primary pressing step S200 is a step in which the material 10 is pressed so that the flow path 21 formed by pressing the material 10 is formed to be deeper than the edge 23, and the side wall 22 is pressed so that the side wall 22 is formed to be higher than the edge 23.

That is, the flow path 21 is formed to be deeper than the edge 23 which is a reference surface in the primary pressing step S200, and the side wall 22 which is a rib is formed to be higher than the edge 23 so that the volume to be planarized in the secondary pressing step S300 which will be described later, can be changed.

After the primary pressing step S200, the primary mold 100 can be released, and a processed molded product 20 can be taken out.

For example, as shown in FIG. 12, the molded product 20 taken out from the upper mold 110 and the lower mold 130 may have the flow path 21, the side wall 22, and the edge 23 formed, and in particular, the top surface of side wall 22 may not be flat because it is not deformed to corners of the rib molding part 142.

A manufacturing method of a separator for a fuel cell according to another embodiment of the present disclosure may further include a transport step S400. The manufacturing method of a separator for a fuel cell of the present disclosure may transfer a molded product 20 pressed in the primary pressing step S200 to the secondary pressing step S300 to perform the secondary pressing step S300 after the primary pressing step S200.

Here, methods may include transferring the molded product 20 pressed in the primary pressing step S200 or moving the lower mold 130 in which the molded product 20 is seated to the secondary pressing step S300.

Figure 13:
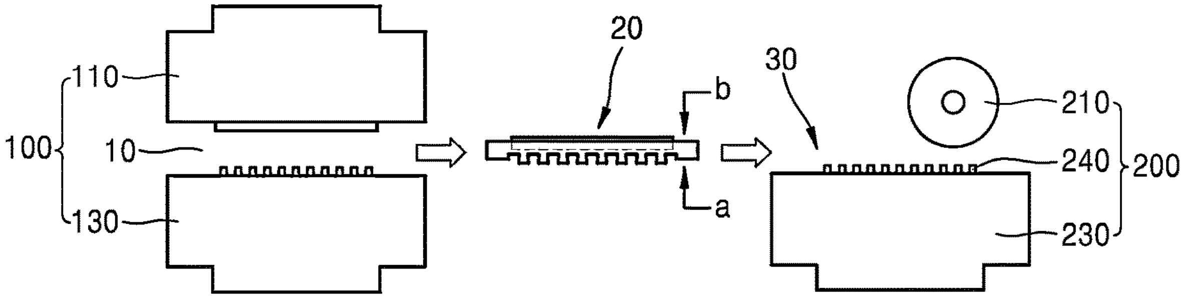
FIG. 13 is a diagram showing a transport step according to an embodiment of the present disclosure.
Figure 14:
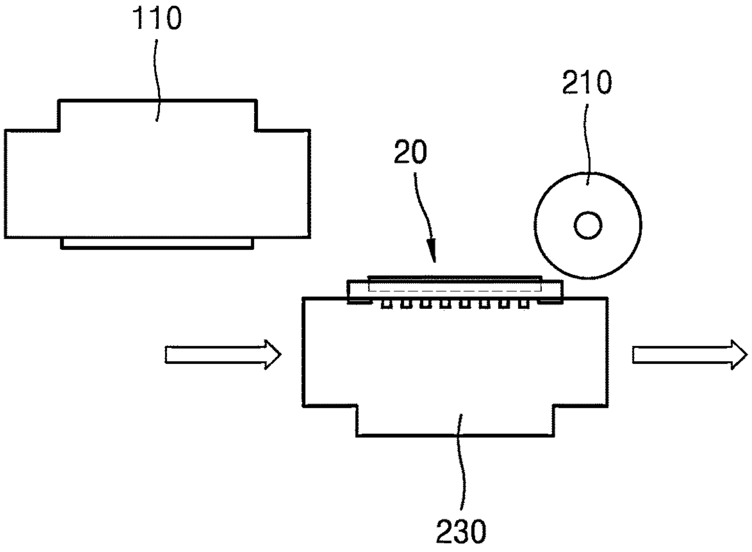
FIG. 14 is a diagram showing a mold replacing step according to another embodiment of the present disclosure.

FIG. 13 is a diagram showing the transport step S400 according to an embodiment of the present disclosure, and FIG. 14 is a diagram showing a mold replacing step S500 according to another embodiment of the present disclosure.

Figure 5:
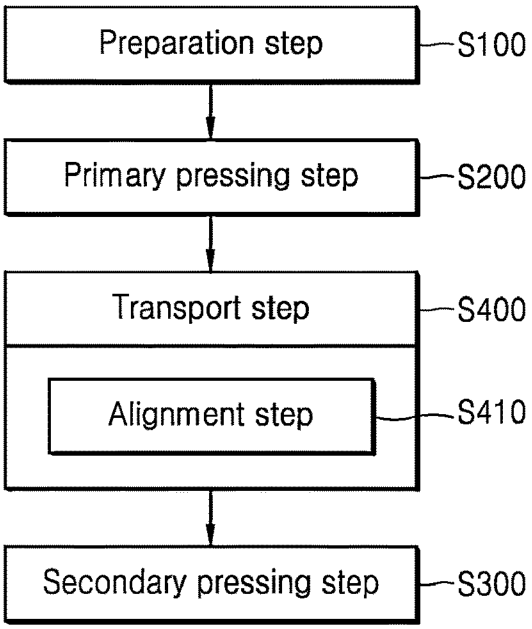
FIGS. 5 to 9 are flowcharts showing a manufacturing method of a separator for a fuel cell according to various embodiments of the present disclosure.

According to an embodiment of the present disclosure, as shown in FIG. 5, the transport step S400 may be further included after the primary pressing step S200.

The transport step S400 is a step of transporting the molded product 20 molded in the primary mold 100 to the secondary mold 200 after the primary pressing step S200.

As shown in FIG. 13, the molded product 20 processed in the primary mold 100 may be taken out and moved to the secondary mold 200 via a transport robot (not shown) or the like.

The transport step S400 may include an alignment step S410 of combining and aligning the flow path 21 and the side wall 22 formed on the lower surface (a) of the molded product 20 to the lower aligning part 240.

The alignment step S410 is a step of combining the lower surface (a) of the molded product 20 with the lower aligning part 240, wherein the shape of the lower aligning part 240 is formed to be identical to the shape of the lower molding part 140.

Thus, when the pressing roll 210 presses the upper surface (b) of the molded product 20 during the secondary pressing step, the flow path 21, the side wall 22, and the edge 23 of the molded product 20 aligned on the alignment step S410 can be supported in the lower aligning part 240.

Figure 6:
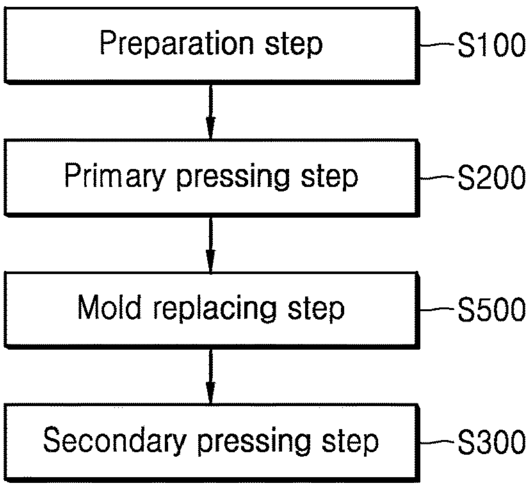

According to another embodiment of the present disclosure, as shown in FIG. 6, a mold replacing step S500 can be further included after the primary pressing step S200.

The mold replacing step S500 is a step of moving the lower mold 130 to the lower part of the pressing roll 210 after the primary pressing step S200 so that the molded product 20 can be secondary pressed along with the pressing roll 210.

For example, as shown in FIG. 14, in the primary pressing step S200, after pressing the material 10 with the upper mold 110 and the lower mold 130 to process the molded product 20, the lower mold 130 may move to the lower part of the pressing roll 210 to serve as the roll die 230.

That is, the lower molding part 140 formed in the lower mold 130 can become the lower aligning part 240 formed on the roll die 230, and the lower mold 130 of the primary mold 100 can become the roll die 230 of the secondary mold 200.

Further, as the lower mold 130 moves, the secondary pressing step S300 can be performed continuously by the pressing roll 210. Accordingly, the production process can be simplified by eliminating the need to perform a process for taking the molded product 20 out, cost is reduced, and production rate can be increased.

Although not shown, the primary pressing step S200 may further include an additional processing step.

The additional processing step may process the top surface of the side wall of the flow path formed on the molded product pressed in the primary pressing step S200. Specifically, in the primary pressing step S200, the side wall of the molded product may be irregularly molded in height, edge, and top surface, and at this time, the side wall may be pressed by an additional mold to make the height, the edge, and the top surface of the side wall uniform.

Here, the additional mold may include a press mold configured to deform the molded product by pressing.

That is, the secondary pressing step S300 can be performed after the primary pressing step S200 and the additional processing step.

Figure 15:
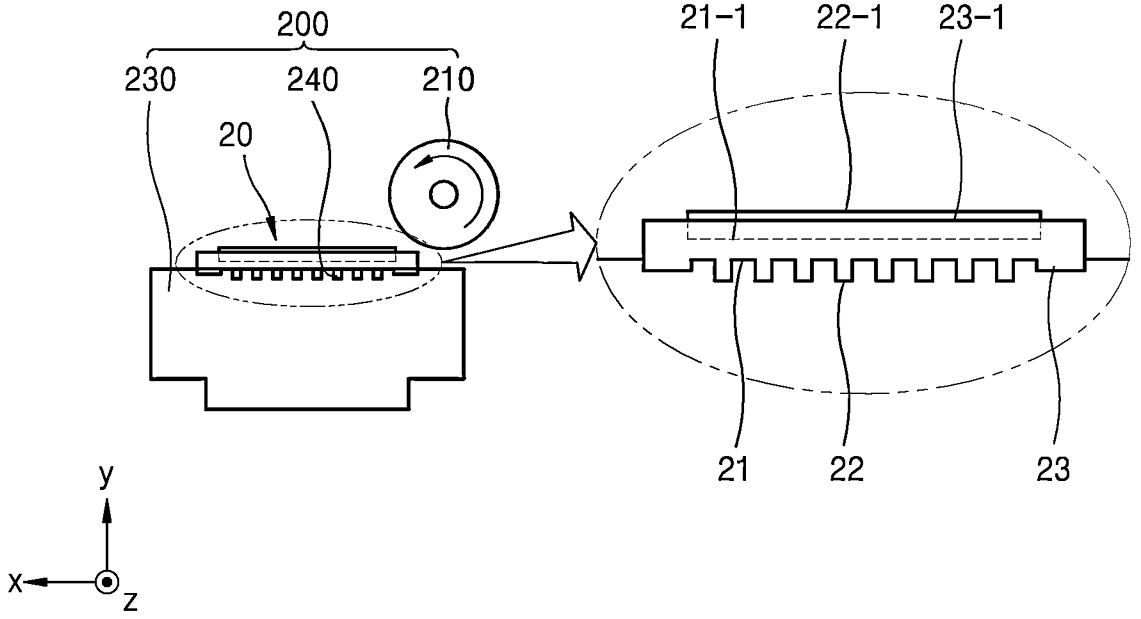
FIGS. 15 to 17 are diagrams showing a secondary pressing step according to an embodiment of the present disclosure.
Figure 16:
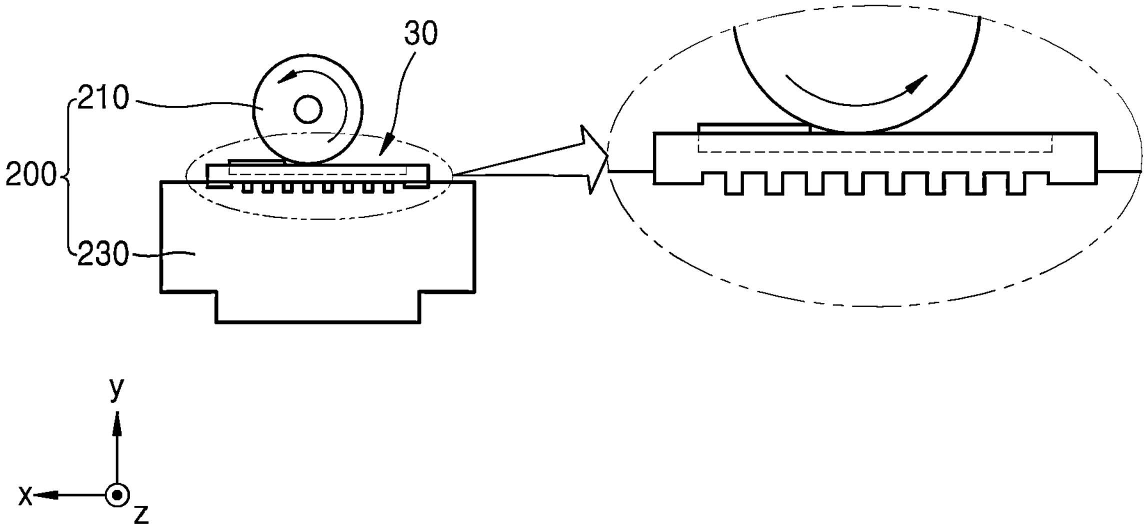
Figure 17:
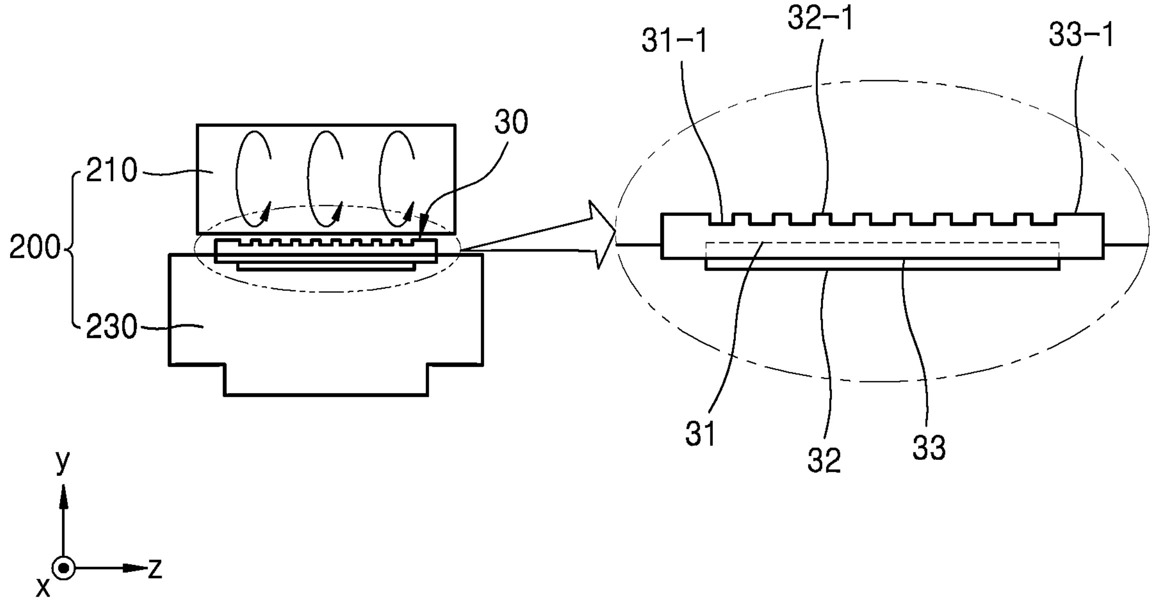
Figure 18:
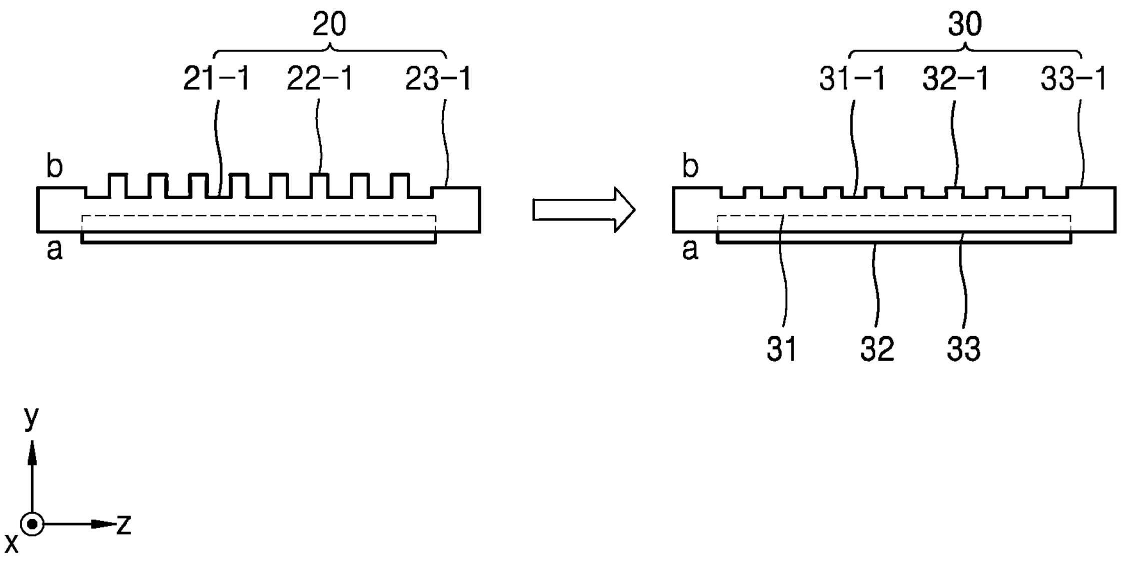
FIG. 18 is a diagram showing a structure in which a material is transformed into a molded product by pressing in the secondary pressing step according to an embodiment of the present disclosure.

FIGS. 15 to 17 are diagrams showing a secondary pressing step S300 according to an embodiment of the present disclosure, and FIG. 18 is a diagram showing a structure in which a molded product 20 according to an embodiment of the present disclosure is transformed into a secondary molded product 30 by pressing in the secondary pressing step S300.

The secondary pressing step S300 is a step of re-pressing with the secondary mold 200 including the pressing roll 210 rotating with a predetermined pressing force and a roll die 230 in which the lower aligning part 240 is formed to planarize the top surface of the side wall 22 of the flow path 21 formed by primary pressing the material 10.

In the secondary pressing step S300, as shown in FIG. 15, the molded product 20 seated on the lower aligning part 240 is pressed by the upper pressing roll 210 while rotating, so as to planarize heights of a side wall 22-1 and an edge 23-1 formed on the top surface of the molded product 20 to be equal, as shown in FIG. 16.

Thus, the molded product 20 may go through the secondary pressing step S300 to be formed into the secondary molded product 30.

For example, as shown in FIG. 18, upon a secondary pressing in an X-axis direction, a flow path 21-1, the side wall 22-1, and the edge 23-1 formed on the upper surface (b) of the molded product 20 may be deformed into a flow path 31-1, a side wall 32-1, and an edge 33-1 of the secondary molded product 30.

The side wall 22-1 of the molded product 20 molded in the primary pressing step S200 is molded to be higher than the edge 23-1, and in the secondary pressing step S300, the upper surface (b) of the molded product 20 can be further pressed so that the side wall 22-1 can be pressed to the height of the edge 23-1 until the side wall 22-1 and the edge 23-1 are equal in height, or both the side wall 22-1 and the edge 23-1 can be pressed and planarized.

By forming the top surface of the side wall 31-1 of the secondary molded product 30 to be flat, the contact surface with an electrode or a collector to which the separator is coupled is expanded, and power generating efficiency of fuel cells can be increased.

Figure 19:
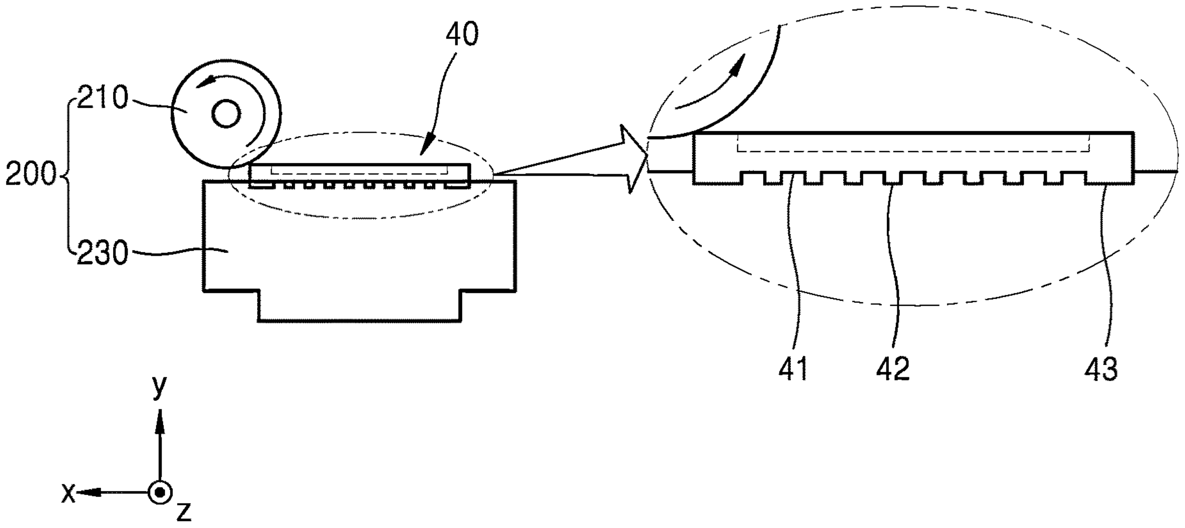
FIG. 19 is a diagram showing a secondary pressing step according to another embodiment of the present disclosure.
Figure 20:
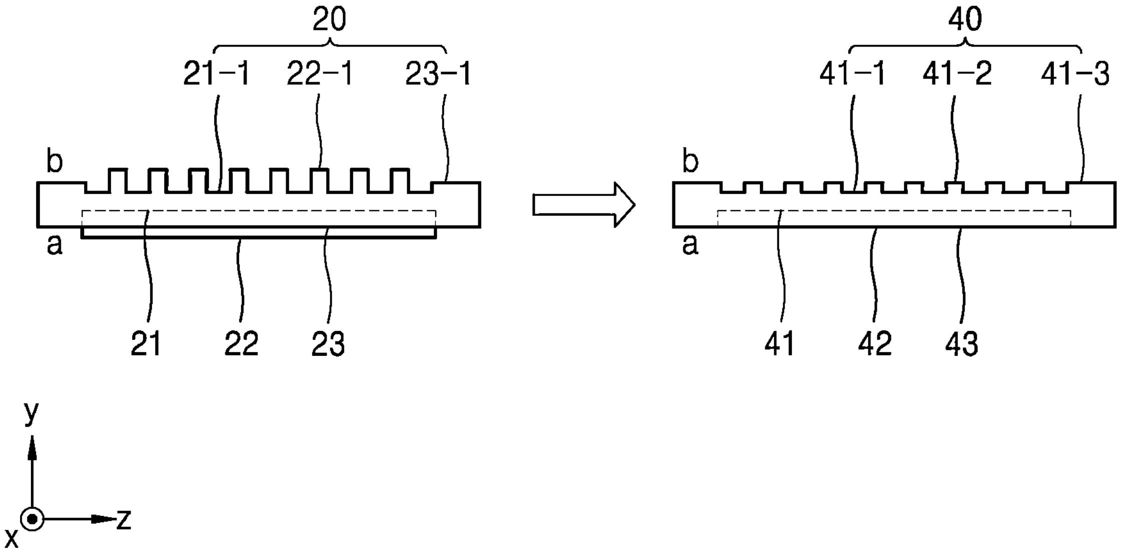
FIG. 20 is a diagram showing a structure in which a molded product is transformed into a secondary molded product by pressing in the secondary pressing step according to another embodiment of the present disclosure.

FIG. 19 is a diagram showing a secondary pressing step S300 according to another embodiment of the present disclosure, and FIG. 20 is a diagram showing a structure in which a molded product 20 of FIG. 19 is transformed into a secondary molded product 40 by pressing in the secondary pressing step S300.

The secondary pressing step S300, as shown in FIG. 16, may planarize the heights of the side wall 22-1 and the edge 23-1 formed at the top surface of the molded product 20 to be equal, as well as planarize the heights of the side wall 22 and the edge 23 formed at the lower surface to be equal.

Specifically, as shown in FIG. 19, a primary pressed molded product may be seated on the roll die 230. Here, the flow path of the molded product which is formed to be relatively high is seated on the rib molding part, and the roll die 230 presses on the upper surface of the molded product so that not only the upper surface of the molded product, but also a side wall 42 and an edge 43 formed at the lower part are pressed at the same time so that heights of the side wall 42 and the edge 43 are equal.

Thus, the molded product 20 may go through the secondary pressing step S300 to be formed into the secondary molded product 40.

For example, as shown in FIG. 20, upon the secondary pressing in the X-axis direction, the flow path 21, the side wall 22, and the edge 23 formed on the lower surface (b) of the molded product 20 may be deformed into a flow path 41, a side wall 42 and an edge 43 of the secondary molded product 40.

The side wall 22 of the molded product 20 molded in the primary pressing step S200 is molded to be higher than the edge 23, and by pressing the upper surface (b) of the molded product 20 in the secondary pressing step S300, both the upper surface (b) and the lower surface (a) are pressed, and the side walls 22, 22-1 can be pressed to the height of the edges 23, 23-1 or both the side walls 22, 22-1 and the edges 23, 23-1 can be pressed so that the heights of the side walls 22, 22-1 and the edges 23, 23-1 are identical on the same surfaces.

Thus, both surfaces of the molded product 20 can be planarized simultaneously in the secondary pressing step S300, thereby increasing the production rate by omitting the process of flipping the upper and lower surface to press the lower surface (a) after pressing the upper surface (b) of the molded product 20, and reducing the cost of the additional process.

Figure 21:
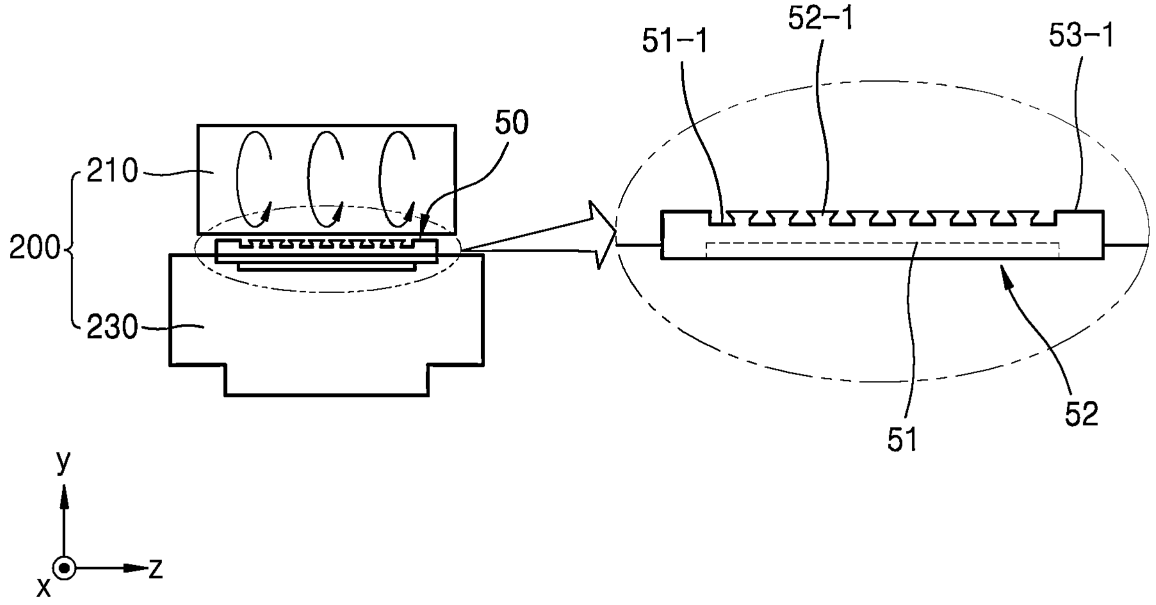
FIG. 21 is a diagram showing a secondary pressing step according to another embodiment of the present disclosure.
Figure 22:
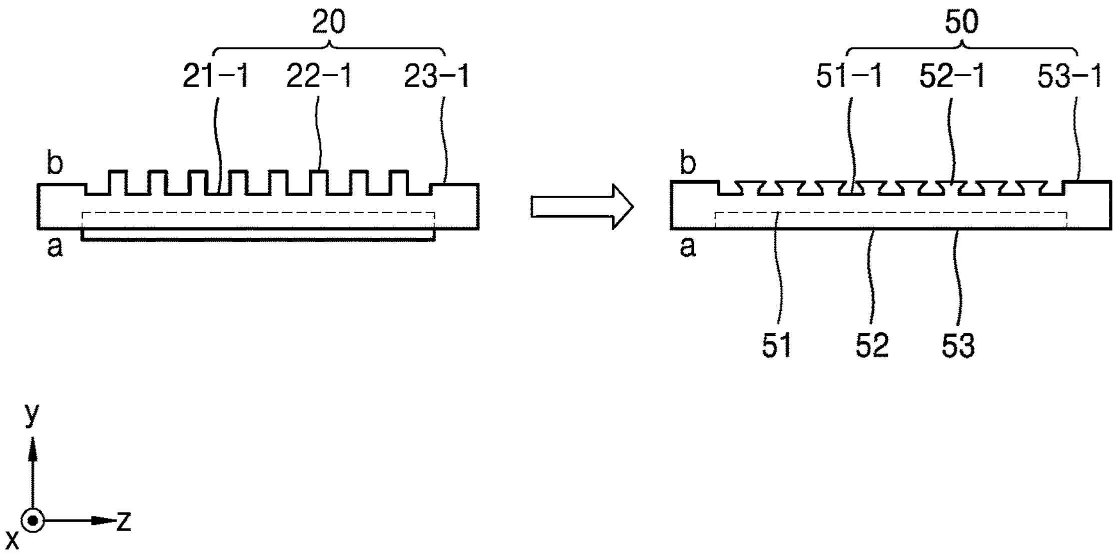
FIG. 22 is a diagram showing a structure in which a molded product according to another embodiment of the present disclosure is transformed into a secondary molded product by pressing in the secondary pressing step.

FIG. 21 is a diagram showing a secondary pressing step S300 according to another embodiment of the present disclosure, FIG. 22 is a diagram showing a structure in which a molded product 20 according to FIG. 21 is transformed into a secondary molded product 50 by pressing in the secondary pressing step S300.

In the secondary pressing step S300, as shown in FIG. 21, the molded product 20 seated on the lower mold 230 is pressed by the upper pressing roll 210 while rotating to deform the top surface of the side wall 22-1 formed on the top surface of the molded product 20 to be wider. The pressing roll 210 can be moved in the X-axis direction.

Thus, the molded product 20 may go through the secondary pressing step S300 to be formed into the secondary molded product 50.

For example, as shown in FIG. 22, upon a secondary pressing in the X-axis direction, the flow path 21-1, the side wall 22-1, and the edge 23-1 formed on the upper surface (b) of the molded product 20 may be deformed into a flow path 51-1, a side wall 52-1, and an edge 53-1 of the secondary molded product 50.

In the secondary pressing step S300, the upper surface (b) of the molded product 20 can be further pressed so that the side wall 22-1 can be pressed to the height of the edge 23-1 until the side wall 22-1 and the edge 23-1 are equal in height, or both the side wall 22-1 and the edge 23-1 can be pressed. Thus, the top surface of the side wall 51-1 of the secondary molded product 50 can be deformed to be wider than the top surface of the side wall 21-1 of the molded product 20.

By forming the top surface of the side wall 51-1 of the secondary molded product 50 to be wide, the contact surface with an electrode or a collector to which the separator is coupled is further expanded and power generating efficiency of fuel cells can be increased.

Figure 23:
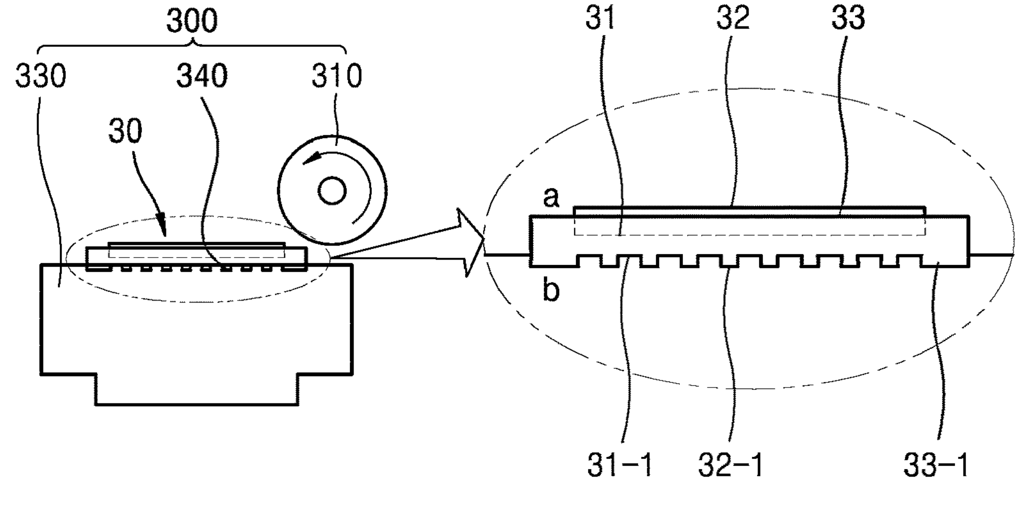
FIGS. 23 and 24 are diagrams showing a tertiary pressing step according to another embodiment of the present disclosure.
Figure 24:
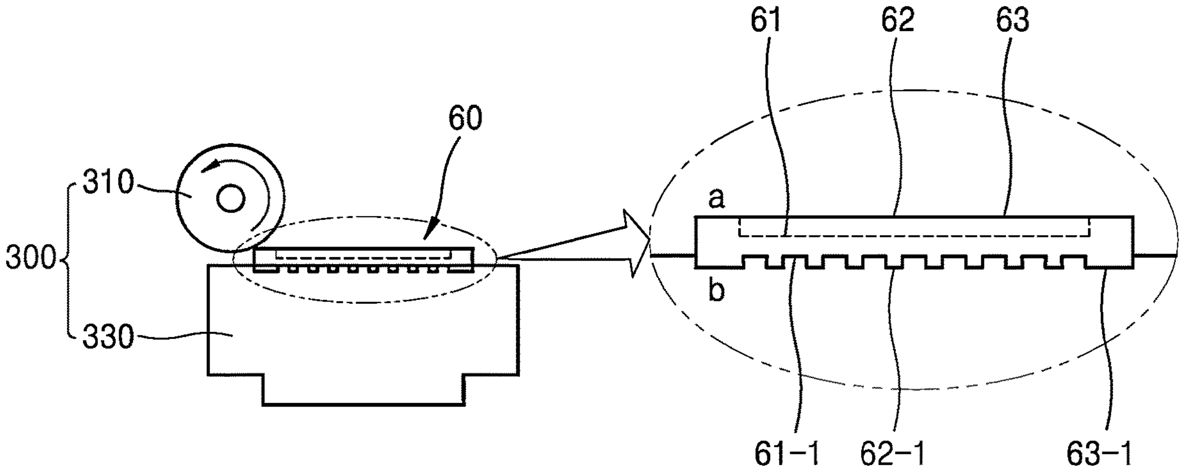
Figure 25:
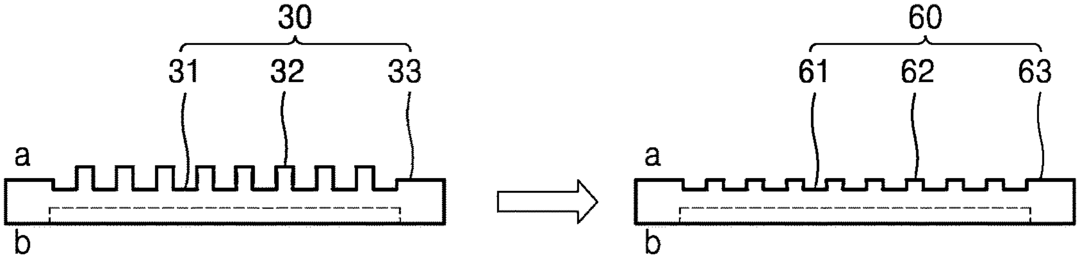
FIG. 25 is a diagram showing a structure in which a secondary molded product is transformed into a tertiary molded product by pressing in the tertiary pressing step according to another embodiment of the present disclosure.

FIGS. 23 and 24 are diagrams showing a tertiary pressing step S600 according to another embodiment of the present disclosure, and FIG. 25 is a diagram showing a structure in which a molded product 30 is transformed into a tertiary molded product 60 by pressing in the tertiary pressing step S600.

Figure 9:
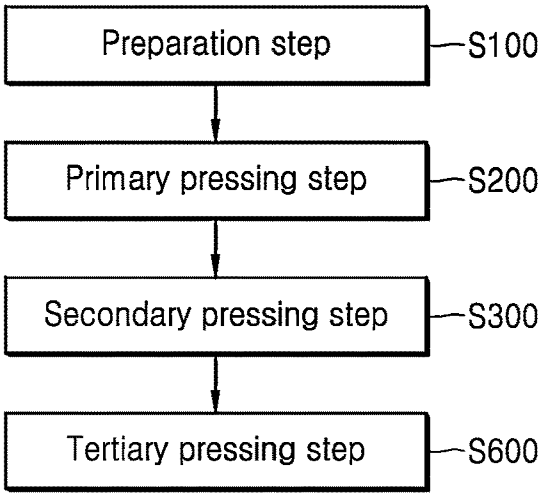

According to another embodiment of the present disclosure, as shown in FIG. 9, the tertiary pressing step S600 may be further included after the secondary pressing step S300.

As shown in FIGS. 23 and 24, the tertiary pressing step S600 is a step of pressing the secondary molded product 30 formed by pressing the molded product 20 in the secondary mold 200 with a tertiary mold 300 including a tertiary pressing roll 310 rotating with a predetermined pressing force and a roll die 330 in which a tertiary aligning part 340 is formed, so that a top surface of a side wall of a flow path formed on other side (a) of the secondary molded product 30 can be planarized.

For example, in the tertiary pressing step S600, a lower surface (a) of the secondary molded product 30 formed in the secondary pressing step S300 is flipped to face upward, and the lower surface (a) of the secondary molded product can be pressed between the pressing roll 310 and the roll die 330.

Thus, the secondary molded product 30 may go through the tertiary pressing step S600 to be formed into the tertiary molded product 60.

For example, as shown in FIG. 25, upon a tertiary pressing, the flow path 31-1, the side wall 32-1, and the edge 33-1 formed on the lower surface (a) of the secondary molded product 30 may be deformed into a flow path 61-1, a side wall 62-1, and an edge 63-1 of the tertiary molded product 60.

By forming all side walls 62, 62-1 of both the upper surface (b) and lower surface (a) of the tertiary molded product 60 to be flat, the contact surface with an electrode or a collector to which the separator is coupled is expanded, and power generating efficiency of fuel cells can be increased.

Although not shown, in the secondary pressing step S300, the side wall 52-1 of the upper surface (b) of secondary molded product 50 is widely deformed, and in the tertiary pressing step S600, the side wall of the lower surface (a) is widely deformed. Accordingly, the side walls on both sides of the tertiary molded product 60 can be deformed to be wider than the width of the side wall of the molded product 20.

The secondary pressing step S300 processes the molded product 20 with rotation of the pressing roll 210 and may include a step of the pressing roll 210 and the molded product 20 moving in relatively opposite directions. That is, the secondary pressing step S300 may include a step of at least one or more of the pressing roll 210 or the molded product 20 moving.

Figure 7:
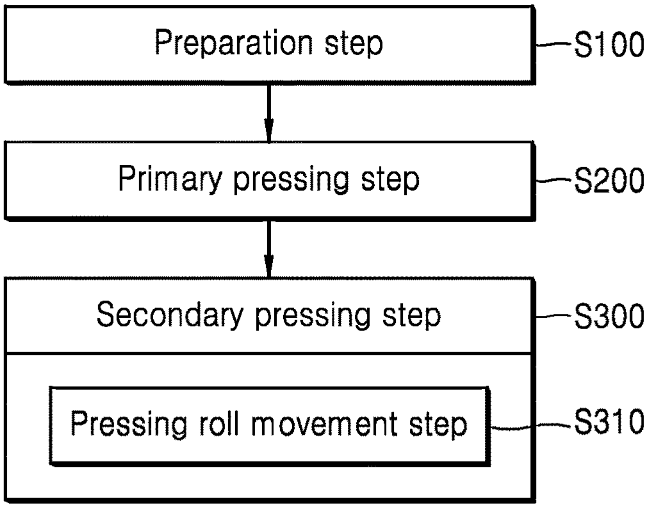

As shown in FIG. 7, the secondary pressing step S300 may include a pressing roll movement step S310.

In the pressing roll movement step S310, the roll die 230 of the secondary mold 200 performing a pressing process may be fixed, and the pressing roll 210 may be formed to be able to move while pressing in a rotated state.

Figure 26:
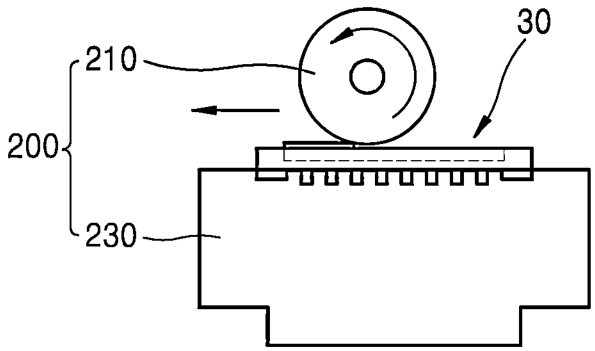
FIGS. 26 and 27 are diagrams showing a secondary pressing step according to various embodiments of the present disclosure.

FIG. 26 is a diagram showing the pressing roll movement step S310 in the secondary pressing step S300.

As shown in FIG. 26, in the pressing roll movement step S310, the upper surface (b) can be pressed as the pressing roll 210 moves to the upper surface(b) of the molded product 20 aligned on the roll die 230.

For example, the lower mold 230 can be fixed to a lower support plate formed at the lower part so that the molded product 30 can be seated, and the pressing roll 210 can press while moving in an upward direction of the molded product 30.

Figure 8:
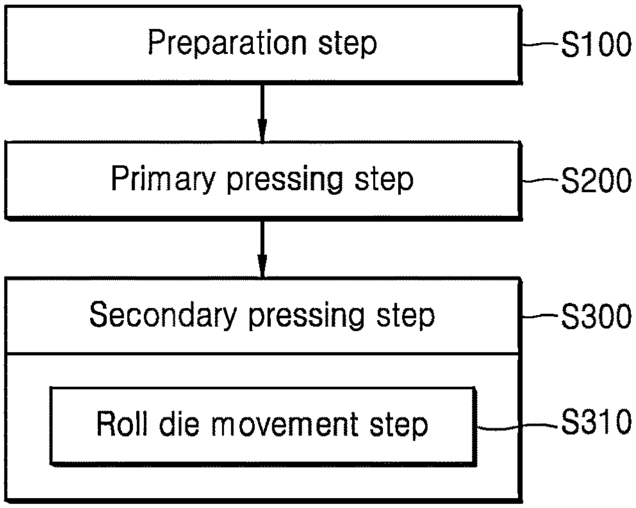

As shown in FIG. 8, the secondary pressing step S300 may include a roll die movement step S320.

In the roll die movement step S320, the pressing roll 210 of the secondary mold 200 performing a pressing process may be fixed, and the roll die 230 may be formed to be able to move.

Figure 27:
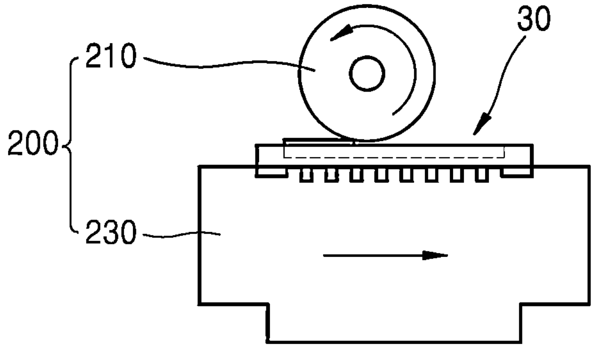

FIG. 27 is a diagram showing the roll die movement step S320 in the secondary pressing step S300.

As shown in FIG. 27, the upper surface (b) of the molded product 20 can be pressed as the molded product 20 aligned with the roll die 230 moves with the roll die 230.

For example, the lower mold 230 can be moved through a moving device formed at the lower part, the molded product 30 seated on the lower mold 230 is moved, and the fixed pressing roll 210 can press while rotating.

Figure 28:
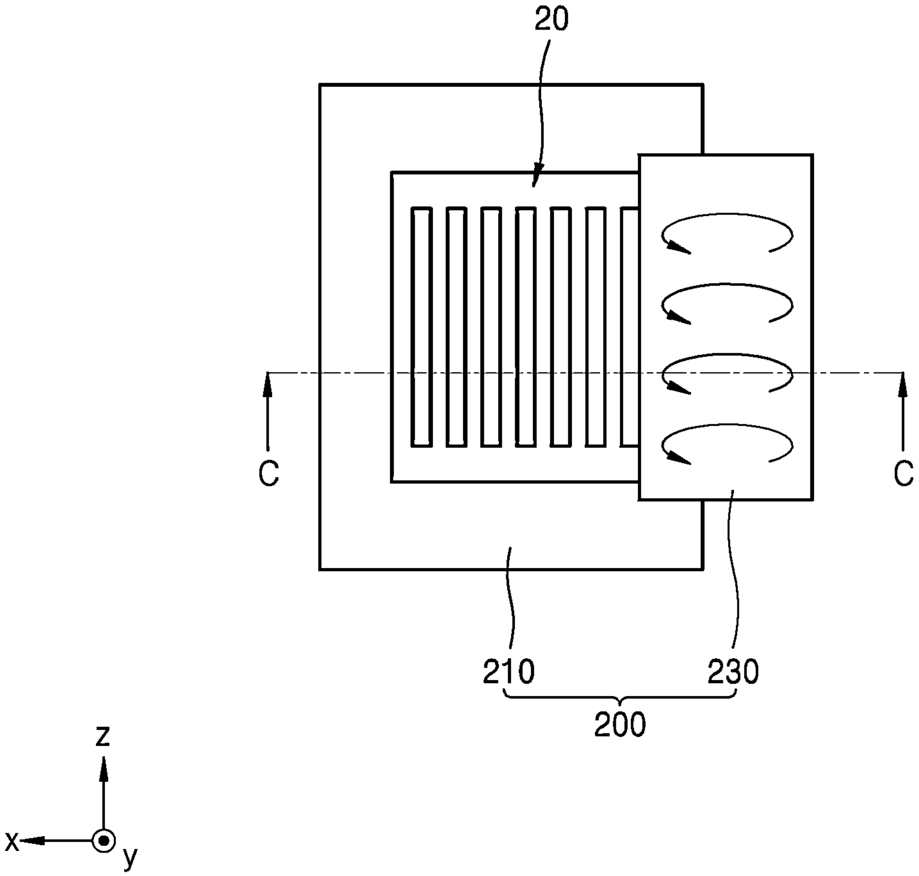
FIGS. 28 and 29 are diagrams showing a secondary pressing step and a molded product according to another embodiment of the present disclosure.
Figure 29:
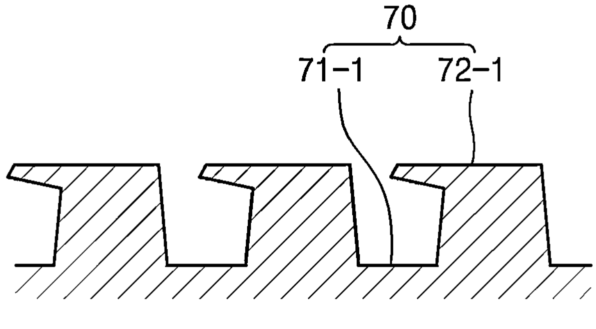

FIGS. 28 and 29 are diagrams showing a secondary pressing step S300 and a secondary molded product 70 according to another embodiment of the present disclosure.

In the secondary pressing step S300, the molded product 20 is seated on the roll die 210 of the secondary mold 200 and can be pressed through the pressing roll 230. Here, the direction of movement of the pressing roll 230 can be pressed in a direction perpendicular to a direction of a flow path formed on the pressed surface of a molded product 20.

Specifically, as shown in FIG. 28, the molded product 20 is seated on the lower mold 230 such that the direction of the flow path is formed in a Z-axis direction. The pressing roll 230 is moved in the X-axis direction to press the molded product 20, such that the shape of the side wall formed on the molded product 20 is deformed in one direction. That is, as shown in FIG. 29, a side wall 72-1 of a flow path 71-1 of the secondary molded product 70 pressed by the secondary mold 200 can deform only to one side which is the direction in which the pressing roll 230 was pressed, to increase the contact area of the top surface.

According to various embodiments of the present disclosure, the secondary pressing step S200 can be used to planarize the contact surface of the separator that the membrane electrode assembly is joined to, or to increase the flow of electrons by increasing the contact area.

Further, the area of the flow path for fuel and air to flow is ensured, while the contact area with the membrane electrode assembly is increased, thereby increasing a current collection rate of a stack.

The present disclosure has been described with reference to the embodiments illustrated in the drawings, but these embodiments are merely illustrative and it should be understood by a person with ordinary skill in the art that various modifications and equivalent embodiments can be made without departing from the scope of the present disclosure. Therefore, the true technical protective scope of the present disclosure should be determined based on the technical concept of the appended claims.

The invention claimed is:

1. A manufacturing apparatus for a separator for a fuel cell, comprising:
- a primary mold comprising
  - an upper mold in which an upper molding part is formed,
  - a lower mold in which a lower molding part is formed, to form a flow path on a material,
  - a flow path molding part which forms the flow path on at least one of an upper surface and a lower surface of the material,
  - an edge molding part which molds an edge of the flow path, and
  - a rib molding part which forms a side wall of the flow path; and
- a secondary mold comprising a pressing roll rotating with a predetermined pressing force and a roll die in which a lower aligning part is formed, and re-pressing a molded product formed by pressing the material in the primary mold to planarize a top surface of the side wall of the flow path formed in the molded product,
- wherein the flow path molding part is formed to be higher than the edge molding part and the flow path formed on the molded product is molded to be deeper than the edge, and
- the rib molding part is formed to be deeper than the edge molding part and the side wall formed on the molded product is formed to be higher than the edge.

2. The manufacturing apparatus for a separator for a fuel cell of claim 1,
- wherein the pressing roll of the secondary mold is pressed to a position of the edge of the molded product or rotated while pressing to a position below a height of the edge to increase an area of the top surface of the side wall.

3. The manufacturing apparatus for a separator for a fuel cell of claim 1,
- wherein the secondary mold is formed with the roll die of the secondary mold fixed and the pressing roll configured to move in a rotating and pressed state so that the pressing roll moves to an upper surface of the molded product aligned on the roll die and presses the upper surface of the molded product.

4. The manufacturing apparatus for a separator for a fuel cell of claim 1, wherein the secondary mold is formed with the pressing roll of the secondary mold fixed and the roll die configured to move so that the molded product aligned on the roll die moves with the roll die and presses an upper surface of the molded product.

5. The manufacturing apparatus for a separator for a fuel cell of claim 1, comprising a tertiary mold comprising a tertiary pressing roll rotating with the predetermined pressing force and a roll die in which a tertiary aligning part is formed, and pressing a secondary molded product formed by pressing the molded product in the secondary mold to planarize a top surface of a side wall of a flow path formed on other surface of the molded product.

* * * * *